United States Patent
Ozaki et al.

(10) Patent No.: US 8,951,158 B2
(45) Date of Patent: Feb. 10, 2015

(54) PLANETARY FRICTION GEAR CONTINUOUSLY VARIABLE TRANSMISSION

(75) Inventors: Shou Ozaki, Fujisawa (JP); Yasushi Yamamoto, Fujisawa (JP); Hirotsugu Yabe, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 14/114,331

(22) PCT Filed: Apr. 27, 2012

(86) PCT No.: PCT/JP2012/061367
§ 371 (c)(1),
(2), (4) Date: Oct. 28, 2013

(87) PCT Pub. No.: WO2012/153656
PCT Pub. Date: Nov. 15, 2012

(65) Prior Publication Data
US 2014/0051540 A1    Feb. 20, 2014

(30) Foreign Application Priority Data

May 6, 2011 (JP) ................................ 2011-103502

(51) Int. Cl.
*F16H 15/48* (2006.01)
*F16H 13/06* (2006.01)
(Continued)

(52) U.S. Cl.
CPC ................ *F16H 15/50* (2013.01); *F16H 15/52* (2013.01)
USPC .......................................... 475/190; 475/197

(58) Field of Classification Search
CPC ........ F16H 15/52; F16H 15/50; F16H 15/506

USPC .................................................. 475/190, 197
See application file for complete search history.

(56) References Cited

U.S. PATENT DOCUMENTS 1,400,500 A * 12/1921 Webb et al. .................... 475/190
3,048,058 A *  8/1962 Chery ........................... 475/197
(Continued)

FOREIGN PATENT DOCUMENTS

JP    62-270860    11/1987
JP    5-1754       1/1993
(Continued)

OTHER PUBLICATIONS

Written Opinion of the International Searching Authority mailed Jul. 24, 2012 in corresponding International Application No. PCT/JP2012/061367.

(Continued)

*Primary Examiner* — Tisha Lewis
(74) *Attorney, Agent, or Firm* — Staas & Halsey LLP

(57) ABSTRACT

Planetary friction gear continuously variable transmission including an input shaft; a carrier; a planetary friction gear having a tapered roller at an inclined rotating shaft; an input-side support section, formed by notching a portion of an outer periphery of a carrier bottom section, rotatably supports an input side of the shaft; a sun roller provided on a same line as the shaft; a ring roller which is rotated by contacting a roller of the gear; an output shaft spaced from the ring roller; a loading section having a rolling body which presses the ring roller and the output shaft in an axial direction when a torque differential arises; and a transmission ring which contacts the tapered roller and allows the gear to spin.

20 Claims, 7 Drawing Sheets

(51) Int. Cl.
*F16H 15/50* (2006.01)
*F16H 15/52* (2006.01)

(56) References Cited

U.S. PATENT DOCUMENTS

| | | | |
|---|---|---|---|
| 3,677,109 A * | 7/1972 | Stuemky | 475/159 |
| 3,889,554 A * | 6/1975 | Sinclair et al. | 475/197 |
| 5,545,100 A * | 8/1996 | Roovers et al. | 475/185 |
| 8,002,661 B2 * | 8/2011 | Sekiya | 475/190 |

FOREIGN PATENT DOCUMENTS

| | | |
|---|---|---|
| JP | 2009-52666 | 3/2009 |
| JP | 2011-56985 | 3/2011 |

OTHER PUBLICATIONS

International Search Report mailed Jul. 24, 2012 in corresponding International Application No. PCT/JP2012/061367.
Patent Abstracts of Japan, Publication No. 62-270860, Published Nov. 25, 1987.
Patent Abstracts of Japan, Publication No. 5-1754, Published Jan. 8, 1993.
Patent Abstracts of Japan, Publication No. 2009-52666, Published Mar. 12, 2009.
Patent Abstracts of Japan, Publication No. 2011-56985, Published Mar. 24, 2011.

* cited by examiner

PLANETARY FRICTION GEAR CONTINUOUSLY VARIABLE TRANSMISSION

CROSS-REFERENCE TO RELATED APPLICATIONS

This application is a U.S. national stage application of PCT/JP2012/061367 filed Apr. 27, 2012 and claims foreign priority benefit of Japanese Patent Application No. 2011-103502 filed May 6, 2011 in the Japanese Patent Office, the contents of both of which are incorporated herein by reference.

TECHNICAL FIELD

The present invention relates to a planetary friction gear continuously variable transmission.

BACKGROUND ART

A planetary friction gear continuously variable transmission using a cone-like-shaped (tapered) planetary gear mechanism as a continuously variable transmission is known. For example, a planetary friction gear continuously variable transmission is disclosed in Patent Document 1 in which: a torque from an input shaft is transmitted to an output shaft via a carrier, a tapered roller, and a ring roller; and a forward rotation, a counter rotation, or no rotation of the output shaft relative to the input shaft is carried out by varying the contact position of a transmission ring and the tapered roller.

PRIOR ART DOCUMENTS

Patent Document 1: Japanese Patent Application Publication No. 2011-56985

In the planetary friction gear continuously variable transmission described above, a loading mechanism in which a rolling body is installed in the circular groove between the ring roller and the output shaft is provided for loading torque. The loading mechanism is configured as that when a torque differential arises between the ring roller and the output shaft, the rolling body presses the ring roller and the output shaft in the axial direction to carry out torque loading.

However, in the technique described above, sufficient pressing force at a contact point between the tapered roller and the transmission ring may not be obtained since the movement of the tapered roller in the axial direction is obstructed by an effect caused by a friction force or accuracy at each contact portion between the tapered roller, the ring roller, or the like.

SUMMARY OF THE INVENTION

The present invention is directed to such issue described above. The object of the present invention is to improve the efficiency of torque loading of the planetary friction gear continuously variable transmission by producing a sufficient degree of pressing force at the contact point between the tapered roller and the transmission ring.

In order to solve the above-described and other objects, a planetary friction gear continuously variable transmission of the present invention includes: an input shaft which is rotatably supported in a case; a carrier formed in a hollow cone-like-shape with a trapezoid cross section in which an outer diameter in an output side is smaller than an outer diameter in an input side, an opening is formed in an outer periphery of the cone, and an output-side end portion of the input shaft is fixed to an outer side surface of a bottom section; a planetary friction gear which is rotatably arranged in an opening of the carrier including, in an order from an input side, a first tapered roller, a second tapered roller, and a third tapered roller on a rotating shaft inclined against an axis of the input shaft; an input-side support section formed by notching a portion of an outer periphery of a bottom section of the carrier, which rotatably supports an input-side end portion of an rotating shaft of the planetary friction gear; a sun roller, provided on a same line as the input shaft, which is in contact with the first tapered roller and the third tapered roller, and thereby rotates; a ring roller, provided on a same line as the input shaft, of which inner circumferential surface is in contact with the third tapered roller, and thereby rotates; an output shaft, provided spaced from an output-side end portion of the ring roller on a same line as the input shaft, which is rotatably supported in the case; a loading section including a rolling body, the rolling body pressing the ring roller and the output shaft in an axial direction when a torque differential arises between the ring roller and the output shaft and being provided in a tapered-shape groove formed between the ring roller and the output shaft; and a transmission ring, provided movable in an axial direction of the input shaft, of which inner circumferential surface is in contact with at least a portion of an outer periphery surface of the second tapered roller, thereby allowing the planetary friction gear to spin.

The input-side support section may be formed by notching a portion of an outer periphery of the carrier bottom section in a V-shaped groove.

An input-side end portion of a rotating shaft of the planetary friction gear may be rotatably supported by the input-side support section via a bearing.

The planetary friction gear continuously variable transmission may further include an output-side support section which is formed by notching an outer periphery of the carrier top section and rotatably supports an output-side end portion of a rotating axis of the planetary friction gear.

The output-side support section is formed by notching a portion of an outer periphery of the carrier top section in a form of a V-shaped groove.

An output-side end portion of a rotating shaft of the planetary friction gear may be rotatably supported by the output-side support section via a bearing.

According to a planetary friction gear continuously variable transmission of the present invention, the torque loading efficiency can effectively be improved by producing a sufficient degree of pressing force at a contact point between the tapered roller and the transmission ring.

DETAILED DESCRIPTION

A planetary friction gear continuously variable transmission according to one embodiment of the present invention will be described based on FIGS. 1 to 7. The same numeral is used for identical elements and names and functions thereof are also the same. Therefore a detailed description on such element will not be repeated.

Figure 1:
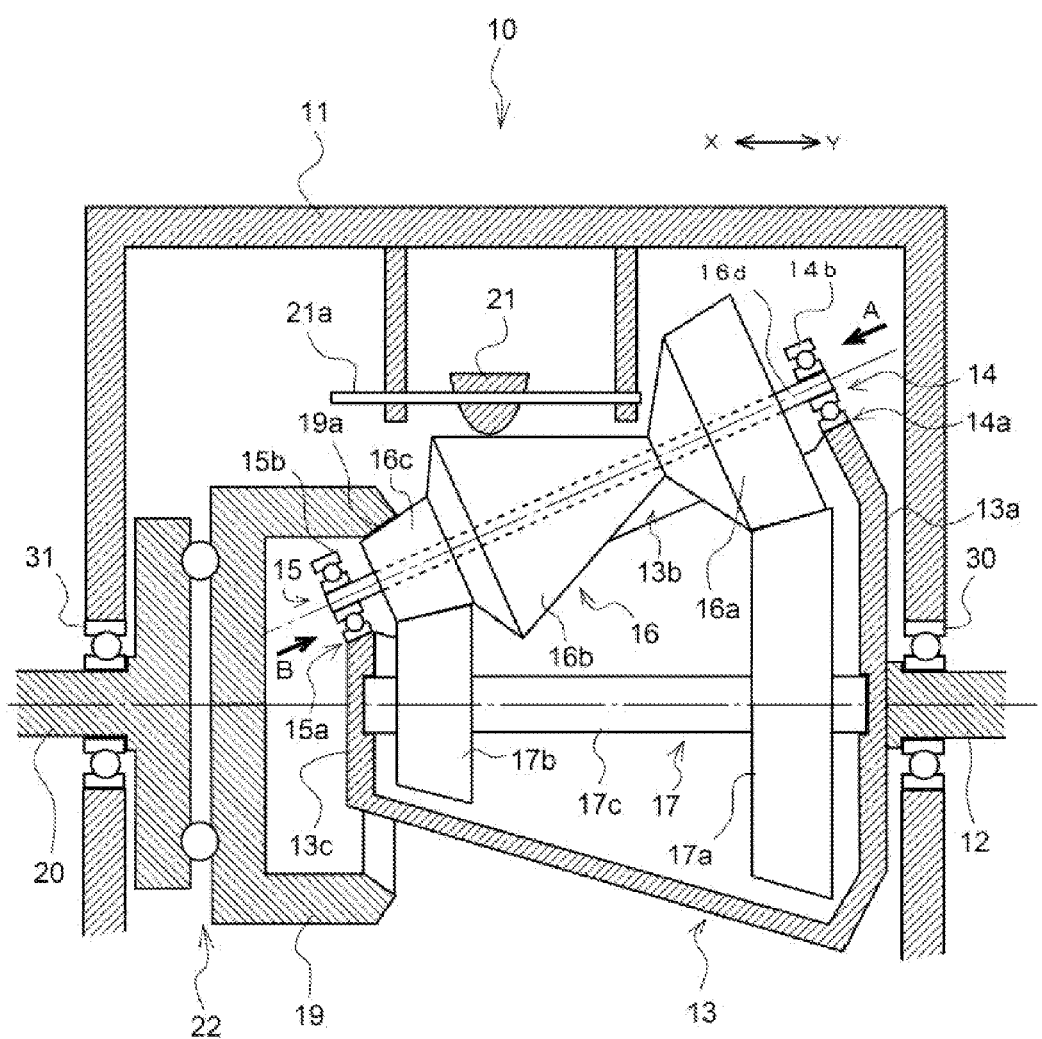
FIG. 1 is a schematic local cross sectional view illustrating a planetary friction gear continuously variable transmission according to one embodiment of the present invention.

As illustrated in FIG. 1, a planetary friction gear continuously variable transmission 10 of the embodiment includes a main case 11, an input shaft 12, a carrier 13, a planetary friction gear 16, a sun roller 17, a ring roller 19, an output shaft 20, a transmission ring 21, and a loading cam section 22. In FIG. 1, illustration of the configuration of the lower half of the planetary friction gear continuously variable transmission 10 is omitted for the convenience of description.

The main case 11 contains therein each of the mechanisms of the planetary friction gear continuously variable transmission 10. Bearings 30 and 31 are provided sides of the main case 11 to rotatably support the input shaft 12, and the output shaft 20, respectively.

The input shaft 12 is connected to a rotating shaft of an engine, which is not shown in the drawing, via a clutch or the like. Further, the input side of the input shaft 12 is inserted into the bearing 30 of the main case 11, and the output side of the input shaft 12 is connected to the carrier 13.

The carrier 13 is formed in a cone-like-shape with a trapezoid cross section in which an outer diameter in the output side is smaller than an outer diameter in the input side. A hollow portion in which the sun roller 17, which will be described later, is rotatably contained is formed inside the carrier 13. Further, the output-side end portion of the input shaft 12 is fixed to the outer side surface of the carrier bottom section 13a, and an opening 13b, in which the planetary friction gear 16 is contained which will be described later, is formed in the conical outer periphery of the carrier 13. A number of openings 13b is determined corresponding to the number (e.g., three to five) of the planetary friction gear 16. Further, an input-side tapered roller support section 14 is provided in the outer periphery of the carrier bottom surface 13a, and an output-side tapered roller support section 15 is provided in the outer periphery of a carrier top section 13c. The number of the input-side tapered roller support section 14 and the output-side tapered roller support section 15 is determined corresponding to the number (e.g., three to five) of the planetary friction gear 16.

Figure 2:
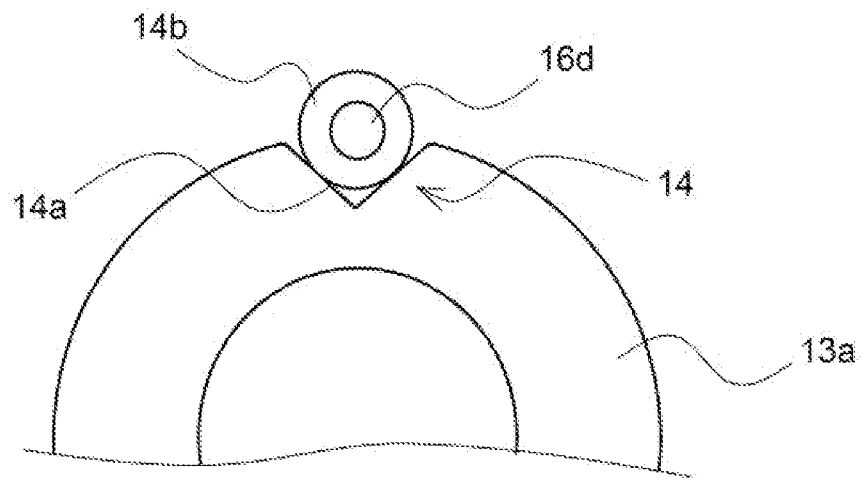
FIG. 2 is a view from arrow A in FIG. 1.

As illustrated in FIG. 2, the input-side tapered roller support section 14 is formed by notching a portion of the outer periphery of the carrier bottom section 13a in a V-shape. That is, the input-side tapered roller support section 14 is configured with a V-shaped groove 14a formed by notching the carrier bottom section 13a in a V-shape from the outer periphery toward the axial center. In the V-shaped groove 14a, the input-side end portion of a rotating shaft 16d of the planetary friction gear 16 is rotatably supported via a bearing 14b.

Figure 3:
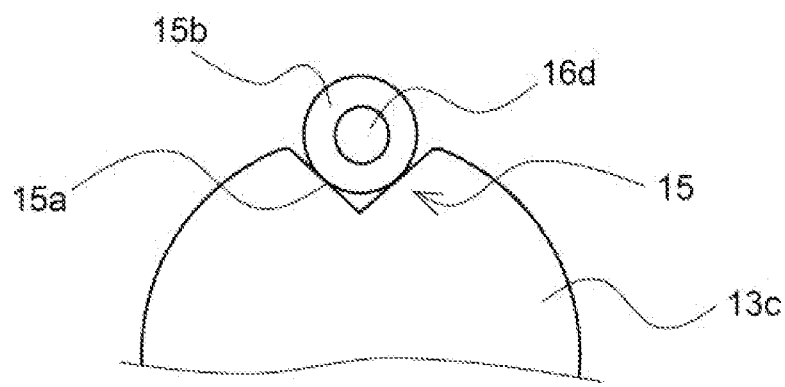
FIG. 3 is a view from arrow B in FIG. 1.

As illustrated in FIG. 3, the output-side tapered roller support section 15 is formed by notching a portion of the outer periphery of the carrier top section 13c in a V-shape. That is, the output-side tapered roller support section 15 is configured with a V-shaped groove 15a formed by notching the carrier top section 13c in a V-shape from the outer periphery toward the axial center. In the V-shaped groove 15a, the output-side end portion of the rotating shaft 16d of the planetary friction gear 16 is rotatably supported via a bearing 15b.

A plurality (e.g., three to five) of the planetary friction gears 16 is provided and arranged so that the rotating shaft 16d inclines in a manner that the distance between the rotating shaft 16d and the axis of the sun roller 17 in the output side is smaller than that in the input side. The sun roller 17 is provided so that the axis thereof is provided on the same line as the input shaft 12. Further, the planetary friction gear 16 includes, in an order from the input side, a first tapered roller 16a, a second tapered roller 16b, and a third tapered roller 16c. The first tapered roller 16a, the second tapered roller 16b, and the third tapered roller 16c are provided so as to integrally rotate with the rotating shaft 16d.

The first tapered roller 16a and the third tapered roller 16c are formed in a cone-like-shape (tapered-shape) in which an outer diameter in the output side is smaller than an outer diameter in the input side. It is configured that the first tapered roller 16a contacts a first roller 17a of the sun roller 17 and the third tapered roller 16c contacts a second roller 17b of the sun roller 17, thereby, rotating the sun roller 17 about a rotating shaft 17c.

The second tapered roller 16b is formed in a cone-like-shape (tapered-shape) in which an outer diameter in the output side is greater than an outer diameter in the input side, and so as the outer periphery surface of the second tapered roller 16b at the far side from the input shaft 12 or the rotating shaft 17c to be parallel to the axes of the input shaft 12 and the rotating shaft 17c. Further, it is configured that the second tapered roller 16b is in contact with the inner surface of the transmission ring 21, thereby spinning along with the rotation of the carrier 13.

The sun roller 17 is rotatably arranged inside the hollow portion of the carrier 13 so that the rotating shaft 17c of the sun roller 17 is positioned on the same line as the axis of the input shaft 12. Further, the first roller 17a which contacts the first tapered roller 16a is provided at the input-side end portion of the rotating shaft 17c, and the second roller 17b which contacts the third tapered roller 16c is provided at the output-side end portion of the rotating shaft 17c. The first roller 17a and the second roller 17b are formed in a cone-like-shape (tapered-shape) in which an outer diameter in the output side is smaller than an outer diameter in the input side.

The ring roller 19 is formed in a cylindrical shape with a bottom, and arranged in a manner that the opening facing the input side and the axis of the ring roller 19 is provided on the same line as the output shaft 20. An inclined surface 19a, having an inclination so that the diameter at the output side is smaller than that at the input side, is formed at the opening of the ring roller 19. The inclined surface 19a is configured to contact the third tapered roller 16c, by which the inclined surface 19a rotates.

The output shaft 20 is rotatably supported in the main case 11 via the bearing 31 in a manner that the axis of the output shaft 20 is positioned on the same line as the input shaft 12. Further, the input-side end portion of the output shaft 20 is connected to the ring roller 19 via the loading cam section 22.

The transmission ring 21 is screwed to a screw shaft 21*a* which is provided in the main case 11 so as to be parallel to the input shaft 12. A stepping motor for rotating the screw shaft 21*a*, which is not shown in the drawing, is provided at an end portion of the screw shaft 21*a*. It is configured that the screw shaft 21*a* rotates according to a command of shifting speed, thereby moving the transmission ring 21 in the axial direction of the input shaft 12 (X-Y direction in FIG. 1).

Figure 4:
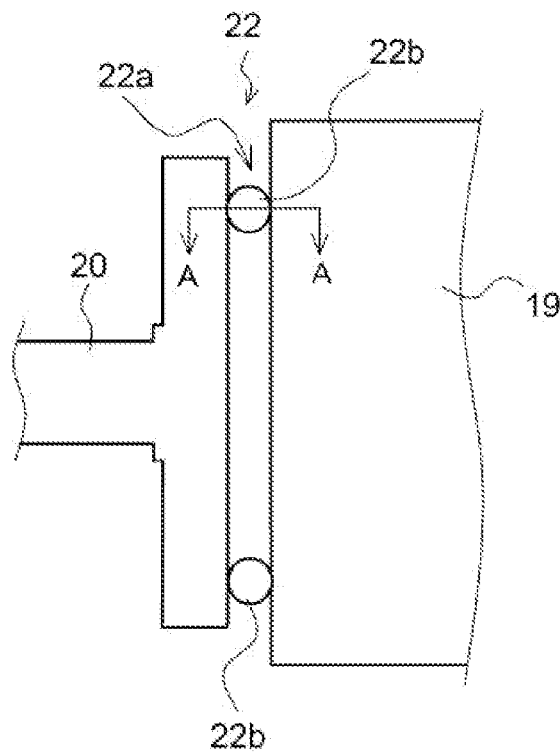
FIG. 4 is a schematic side view illustrating a loading cam section of a planetary friction gear continuously variable transmission according to one embodiment of the present invention.
Figure 5A:
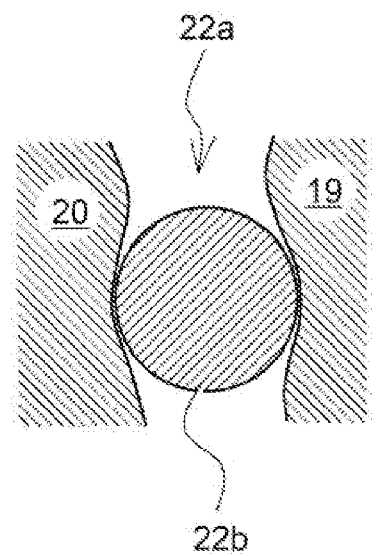
FIG. 5(a) is a sectional view taken along section A-A of FIG. 4 illustrating a state of a loading cam section under a no load condition.
Figure 5B:
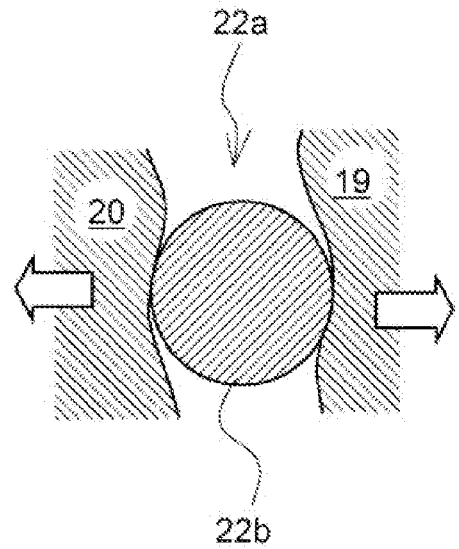
FIG. 5(b) is a sectional view taken along section A-A of FIG. 4 illustrating a state of a loading cam section under a loading condition.

The loading cam section 22 is configured to have a circular groove 22*a* formed between the ring roller 19 and the output shaft 20 in which a tapered shape is formed in the direction of rotation, and a ball (rolling body) 22*b* is provided inside the circular groove 22*a* as illustrated in FIG. 4. The loading cam section 22 is configured so that the ball 22*b* presses the ring roller 19 and the output shaft 20 in the axial direction when the state changes from no load condition (see FIG. 5(*a*)) to loading condition (see FIG. 5(*b*)) in which a torque differential arises, whereby the torque loading is carrying out. The circular groove 22a may be in any form if a tapered shape can be formed therein in the direction of rotation, and may be, for example, a V-shaped groove.

The effect of the planetary friction gear continuously variable transmission 10 according to the embodiment described above will be described below.

When a clutch, which is not shown in the drawings, is in a connected state and thereby the input shaft 12 rotates, the carrier 13 rotates integrally with the input shaft 12 and also the planetary friction gear 16, in which the rotating shaft 16d is supported by the V-shaped groove 14*a*, revolves. In this state, since the second tapered roller 16*b* of the revolving planetary friction gear 16 is in contact with the inner circumferential surface of the transmission ring 21, the second tapered roller 16*b* spins in the direction opposite to the revolving direction of the planetary friction gear 16. Further simultaneously, as for the sun roller 17, since the first roller 17*a* is in contact with the first tapered roller 16*a* of the planetary friction gear 16 and the second roller 17*b* is in contact with the third tapered roller 16*c* of the planetary friction gear 16, the sun roller 17 rotates in the direction opposite to the spin direction of these tapered rollers 16*a* to 16*c*.

Since the ring roller 19 is in contact with the third tapered roller 16*c* of the planetary friction gear 16, the ring roller 19 rotates in the direction opposite to the spin direction of the third tapered roller 16*c*, by which the torque differential arises between the ring roller 19 and the output shaft 20. And by the torque differential, the ring roller 19 and the output shaft 20 are pressed in the axial direction by the ball 22*b* of the loading cam section 22, and thereby the output shaft 20 rotates together with the ring roller 19.

Figure 6A:
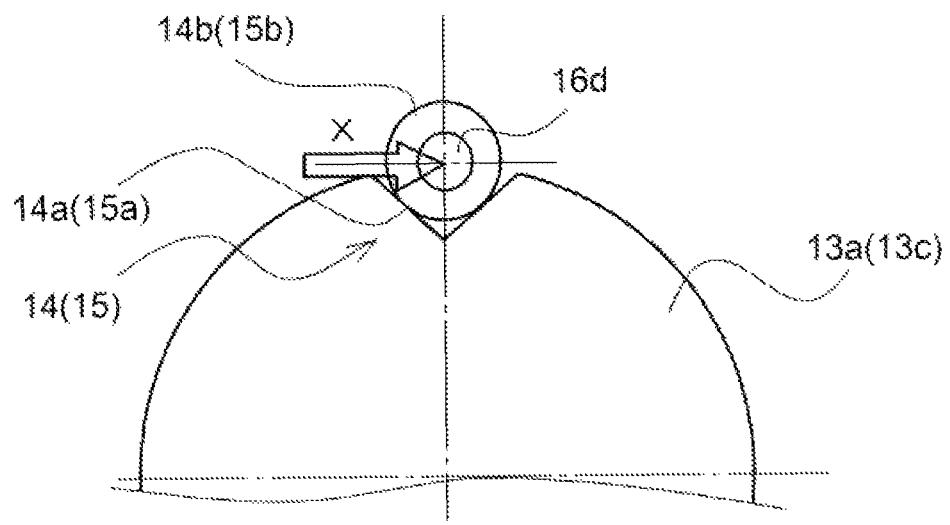
FIG. 6(a) is a schematic front view illustrating a pressing force acting on a rotating shaft of a planetary friction gear.
Figure 6B:
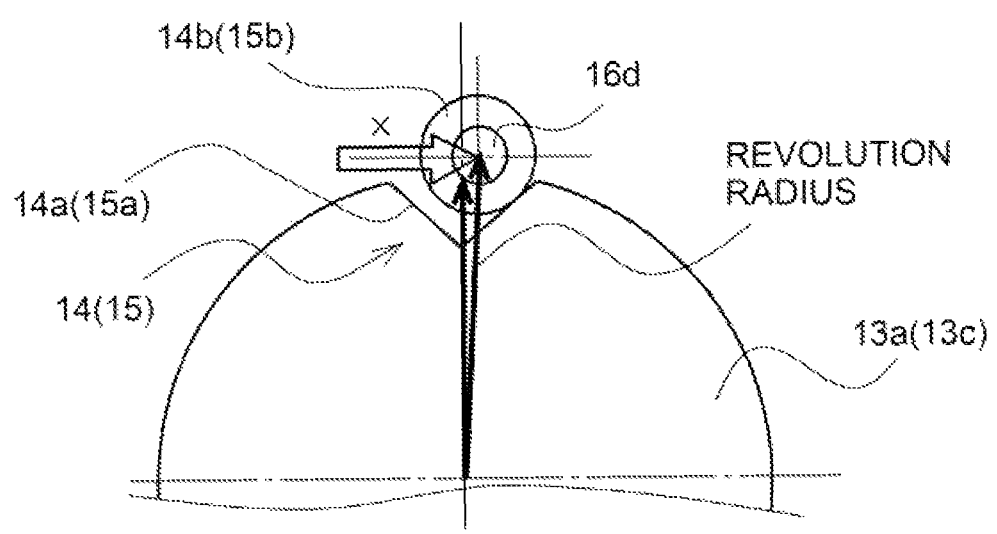
FIG. 6(b) is a schematic front view illustrating a state in which a revolution radius of a rotating shaft of a planetary friction gear is increased.
Figure 7:
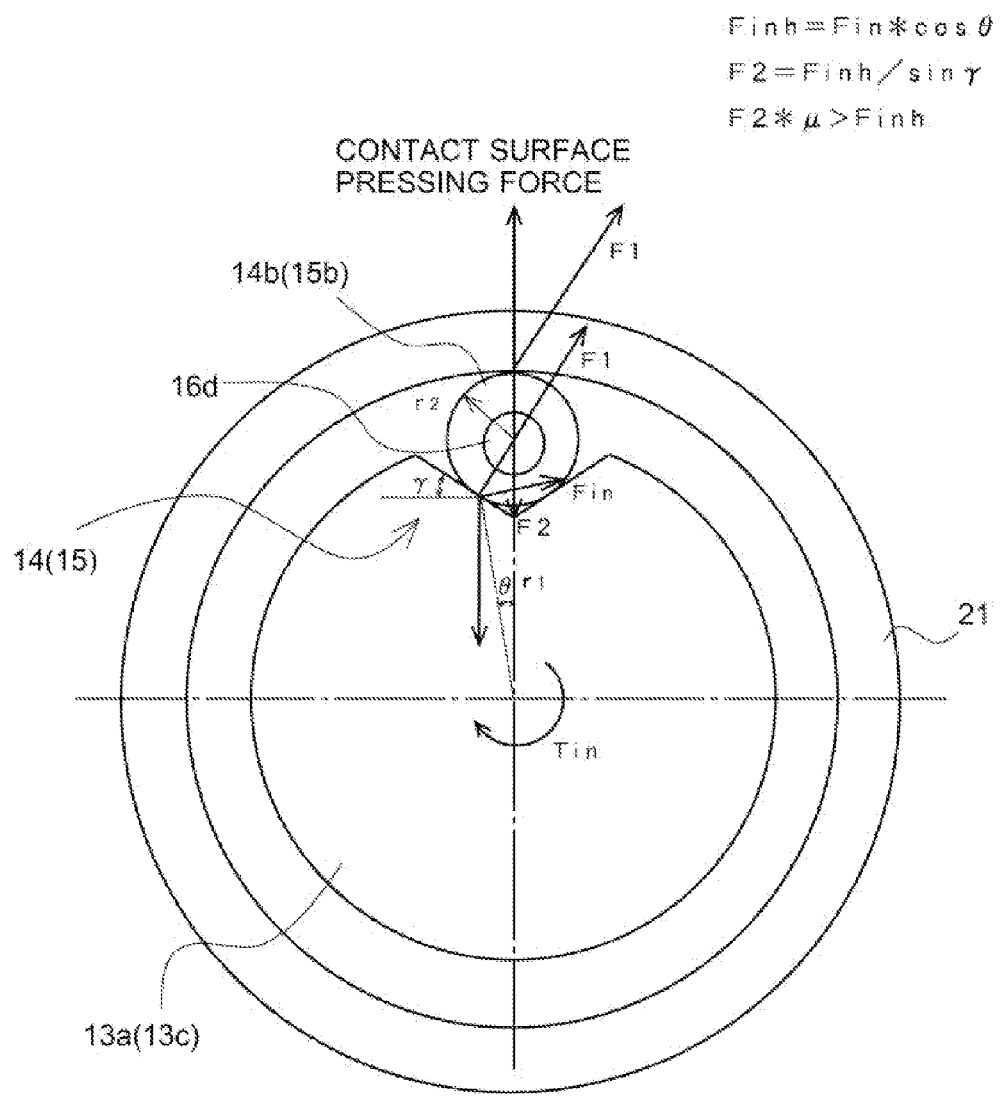
FIG. 7 is a schematic front view illustrating a contact surface pressing force acting between a planetary friction gear and a transmission ring.

As described above, when the torque differential arises during the torque loading, a force which acts in the opposite direction of the rotation of the carrier 13 is produced at the input-side end portion of the rotating shaft 16*d* supported by the V-shaped groove 14*a* via the bearing 14*b* and the output-side end portion of the rotating shaft 16*d* supported by the V-shaped groove 15*a* via the bearing 15*b* (see arrow X in FIG. 6(*a*)). Further, as described in FIG. 6(*b*), the rotating shaft 16*d* is pushed outward from the center of the revolution, thereby increasing the revolution radius of the planetary friction gear 16. Whereby, a pressing force is produced at the contact portion between the second tapered roller 16*b* and the transmission ring 21. In this state, as described in FIG. 7, the input torque Tin (Fin) is converted into a much greater contact surface pressing force by wedge effect via the cam mechanism, thereby producing the loading force.

Therefore, a sufficient degree of pressing force can be produced at the contact portion between the second tapered roller 16*b* and the transmission ring 21 and also the torque loading efficiency can efficiently be improved.

Further, since torque loading of the planetary friction gear continuously variable transmission 10 is carried out efficiently, a load on each of the bearings 14*b* and 15*b* can efficiently be reduced.

Further, as for the rotating shaft 16*d* of the planetary friction gear 16, the input-side end portion is supported by the V-shaped groove 14*a*, and the output-side end portion is supported by the V-shaped groove 15*a*. That is, when the planetary friction gear continuously variable transmission 10 is in a stop, the input-side end portion of the rotating shaft 16*d* sits in the bottom of the V-shaped groove 14*a*, and on the other hand, the output-side end portion of the rotating shaft 16*d* sits in the bottom of the V-shaped groove 15*a*.

Therefore, whenever the planetary friction gear continuously variable transmission 10 is in a stop, the planetary friction gear 16 can be positioned in the center of the input-side tapered roller support section 14 and the output-side tapered roller support section 15.

The present invention is not limited to the embodiments described above, and any modification may suitably be made without deviating the spirit of the present invention.

Figure 8A:
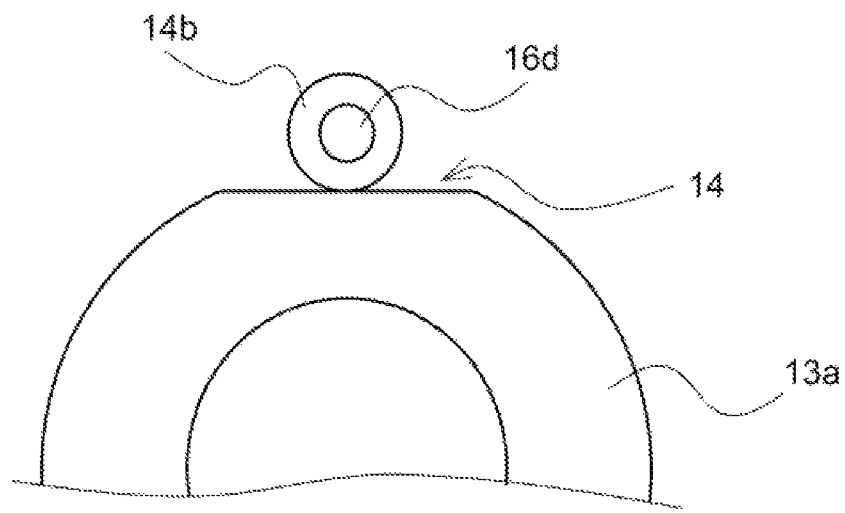
FIG. 8(a) is a schematic front view illustrating a portion of an input-side tapered roller support section according to another embodiment.
Figure 8B:
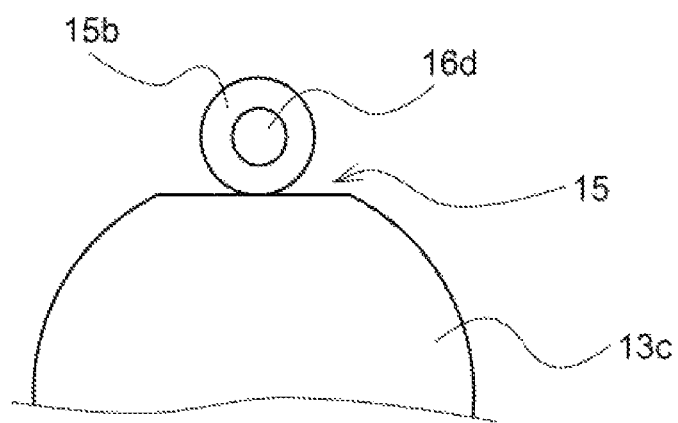
FIG. 8(b) is a schematic front view illustrating a portion of an output-side tapered roller support section according to another embodiment.
Figure 9:
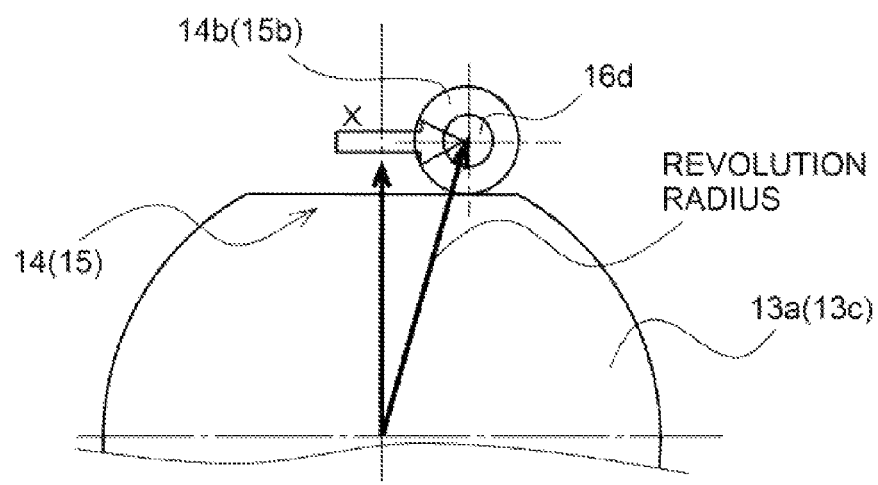
FIG. 9 is a schematic front view illustrating a state in which a revolution radius of a rotating shaft of a planetary friction gear is increased according to another embodiment.

For example, the input-side tapered roller support section 14 is not necessarily be formed in a groove having a V-shape, and may be formed by linearly notching a portion of the outer periphery of the carrier 13 as described in FIG. 8(*a*). Similarly, the output-side tapered roller support section 15 may be formed by linearly notching a portion of the outer periphery of the carrier top section 13*c* as described in FIG. 8(*b*). In this case, as illustrated in FIG. 9, the rotating shaft 16*d* is pushed outward from the center of the revolution, thereby increasing the revolution radius of the planetary friction gear 16, and whereby an effect similar to that of the embodiment described above can be obtained.

The invention claimed is:

1. A planetary friction gear continuously variable transmission comprising:
   an input shaft which is rotatably supported in a case;
   a carrier formed in a hollow cone-shape with a trapezoid cross section in which an outer diameter in an output side is smaller than an outer diameter in an input side, an opening is formed in an outer periphery of the cone, and an output-side end portion of the input shaft is fixed to an outer side surface of a bottom section of the carrier;
   a planetary friction gear which is rotatably arranged in the opening of the carrier including, in an order from an input side, a first tapered roller, a second tapered roller, and a third tapered roller on a rotating shaft inclined relative to an axis of the input shaft;
   an input-side support section formed by notching a portion of an outer periphery of the bottom section of the carrier, which input-side support section rotatably supports an input-side end portion of the rotating shaft of the planetary friction gear;
   a sun roller, provided on a same line as the input shaft, and being in contact with the first tapered roller and the third tapered roller, and thereby rotates;
   a ring roller, provided on the same line as the input shaft, of which an inner circumferential surface is in contact with the third tapered roller, and thereby rotates;

an output shaft, provided spaced from an output-side end portion of the ring roller on the same line as the input shaft, which is rotatably supported in the case;

a loading section including a rolling body, the rolling body pressing the ring roller and the output shaft in an axial direction when a torque differential arises between the ring roller and the output shaft and being provided in a tapered-shape groove formed between the ring roller and the output shaft; and a transmission ring, provided movable in an axial direction of the input shaft, of which an inner circumferential surface is in contact with at least a portion of an outer periphery surface of the second tapered roller, thereby allowing the planetary friction gear to spin.

2. The planetary friction gear continuously variable transmission according to claim 1, wherein the input-side support section is formed by notching a portion of an outer periphery of the carrier bottom section in a V-shaped groove.

3. The planetary friction gear continuously variable transmission according to claim 1, wherein an input-side end portion of the rotating shaft of the planetary friction gear is rotatably supported by the input-side support section via a bearing.

4. The planetary friction gear continuously variable transmission according to claim 2, wherein an input-side end portion of the rotating shaft of the planetary friction gear is rotatably supported by the input-side support section via a bearing.

5. The planetary friction gear continuously variable transmission according to claim 1, further comprising:

an output-side support section which is formed by notching an outer periphery of a top section of the carrier and rotatably supports an output-side end portion of a rotating axis of the planetary friction gear.

6. The planetary friction gear continuously variable transmission according to claim 2, further comprising:

an output-side support section which is formed by notching an outer periphery of a top section of the carrier and rotatably supports an output-side end portion of a rotating axis of the planetary friction gear.

7. The planetary friction gear continuously variable transmission according to claim 3, further comprising:

an output-side support section which is formed by notching an outer periphery of a top section of the carrier and rotatably supports an output-side end portion of a rotating axis of the planetary friction gear.

8. The planetary friction gear continuously variable transmission according to claim 4, further comprising:

an output-side support section which is formed by notching an outer periphery of a top section of the carrier and rotatably supports an output-side end portion of a rotating axis of the planetary friction gear.

9. The planetary friction gear continuously variable transmission according to claim 5, wherein the output-side support section is formed by notching a portion of an outer periphery of a top section of the carrier in a form of V-shaped groove.

10. The planetary friction gear continuously variable transmission according to claim 6, wherein the output-side support section is formed by notching a portion of an outer periphery of a top section of the carrier in a form of V-shaped groove.

11. The planetary friction gear continuously variable transmission according to claim 7, wherein the output-side support section is formed by notching a portion of an outer periphery of a top section of the carrier in a form of V-shaped groove.

12. The planetary friction gear continuously variable transmission according to claim 8, wherein the output-side support section is formed by notching a portion of an outer periphery of a top section of the carrier in a form of V-shaped groove.

13. The planetary friction gear continuously variable transmission according to claim 5, wherein an output-side end portion of the rotating shaft of the planetary friction gear is rotatably supported by the output-side support section via a bearing.

14. The planetary friction gear continuously variable transmission according to claim 6, wherein an output-side end portion of the rotating shaft of the planetary friction gear is rotatably supported by the output-side support section via a bearing.

15. The planetary friction gear continuously variable transmission according to claim 7, wherein an output-side end portion of the rotating shaft of the planetary friction gear is rotatably supported by the output-side support section via a bearing.

16. The planetary friction gear continuously variable transmission according to claim 8, wherein an output-side end portion of the rotating shaft of the planetary friction gear is rotatably supported by the output-side support section via a bearing.

17. The planetary friction gear continuously variable transmission according to claim 9, wherein an output-side end portion of the rotating shaft of the planetary friction gear is rotatably supported by the output-side support section via a bearing.

18. The planetary friction gear continuously variable transmission according to claim 10, wherein an output-side end portion of the rotating shaft of the planetary friction gear is rotatably supported by the output-side support section via a bearing.

19. The planetary friction gear continuously variable transmission according to claim 11, wherein an output-side end portion of the rotating shaft of the planetary friction gear is rotatably supported by the output-side support section via a bearing.

20. The planetary friction gear continuously variable transmission according to claim 12, wherein an output-side end portion of the rotating shaft of the planetary friction gear is rotatably supported by the output-side support section via a bearing.

* * * * *